United States Patent [19]

Hunjan et al.

[11] Patent Number: 4,648,794

[45] Date of Patent: Mar. 10, 1987

[54] PUMP WITH HIGH SPEED EXPELLER

[75] Inventors: Harjit S. Hunjan, Douglas County; Daryl P. Jones, Woodland Park, both of Colo.

[73] Assignee: Joy Manufacturing Company, Pittsburgh, Pa.

[21] Appl. No.: 730,143

[22] Filed: May 3, 1985

[51] Int. Cl.[4] ............................................. F04D 29/08
[52] U.S. Cl. .................. 415/170 B; 415/168; 415/169 R; 415/143; 415/62
[58] Field of Search ............ 415/168, 169 A, 169 R, 415/170 R, 170 A, 170 B, 173 A, 62, 109, 122 R, 122 A, 143, 60, 66; 416/128, 129

[56] References Cited

U.S. PATENT DOCUMENTS

| | | | |
|---|---|---|---|
| 823,077 | 6/1906 | Pitman | 415/169 |
| 2,494,368 | 1/1950 | Steele et al. | 416/129 |
| 3,639,073 | 2/1972 | Beck, Jr. et al. | 415/143 |
| 3,692,402 | 9/1972 | Mittelstaedt | 415/62 |
| 3,731,940 | 5/1973 | Spruiell | 415/173 A |
| 3,868,196 | 2/1975 | Lown | 415/62 |
| 4,269,566 | 5/1981 | Spruiell | 415/170 B |
| 4,408,953 | 10/1983 | Nasuytis et al. | 415/62 |
| 4,421,452 | 12/1983 | Rougemont | 415/122 A |
| 4,521,151 | 6/1985 | Frater et al. | 415/170 B |
| 4,526,507 | 7/1985 | Bingler | 415/170 B |

Primary Examiner—Robert E. Garrett
Assistant Examiner—John Kwon
Attorney, Agent, or Firm—Edward L. Levine

[57] ABSTRACT

Pumps for pumping liquids including a gear train for rotating an expeller at a speed greater than the speed of the pump primary impeller.

10 Claims, 2 Drawing Figures

PUMP WITH HIGH SPEED EXPELLER

BACKGROUND OF THE INVENTION

This invention relates to sealing mechanisms for the shaft of a rotary pump, and more particularly to pumps having rotatable expellers.

Centrifugal pumps typically include some type of sealing arrangement at the shaft end of the pump. It is common, for example, to install packing in a stuffing box positioned about the shaft and to flush the packing with a supply of water or other liquid at higher pressure than the circulating pump pressure. Mechanical seals about the pump shaft also are often utilized.

To reduce the loading on the seals, pump impellers often include pump-out vanes on their rear surfaces and, in addition, a separate rotatable expeller is sometimes included to assist in reducing the pressure at the seals. The expeller commonly is smaller than the impeller and is affixed to and rotates at the same angular velocity as the pump shaft. Thus, the expellers do not create a sufficient head to overcome the head generated by the impeller.

Exemplary of such pumps is that shown in U.S. Pat. No. 3,213,798 which discloses a pump having an impeller mounted on the end of a shaft and floating ring type seals surrounding the shaft. A flushing fluid is injected into a passage adjacent the seals and an auxiliary impeller is mounted on and rotates directly with the shaft. Similar pump arrangements are shown in U.S. Pat. No. 3,429,268 which discloses a pump including a subsidiary impeller affixed through an inducer to rotate directly with the pump shaft; U.S. Pat. No. 2,127,865 which discloses a pump having radial vanes on the front and rear exterior surfaces of the primary impeller as well as a flange fixed to the pump shaft having moving vanes which cooperate with fixed vanes to prevent an inflow of air to the shaft; and, U.S. Pat. No. 1,932,214 which discloses a pump with two impellers mounted directly onto a shaft.

It is desirable to provide a pump arrangement which reduces the shaft seal loading and which overcomes or alleviates the head generated by the primary impeller contributing to fluid leakage. It is further desirable to reduce the head on the stuffing box or mechanical seals, or to reduce the need for these seals.

SUMMARY OF THE INVENTION

This invention provides a pump for fluids, primarily liquids or slurries, including structure for reducing the loading on shaft seals and accordingly leakage from the pump. In particular, the invention allows replacement of stuffing box arrangements. In preferred form a pump includes a primary impeller affixed to rotate with the pump shaft so as to receive liquid through a pump casing inlet, increase the head, and discharge the liquid through an outlet. Spaced behind the impeller is an expeller, preferably segregated from the impeller by a mechanical seal and/or a liner for minimizing the clearance area through which leakage flow passes. The expeller is rotatably driven by the shaft, but is not affixed directly to the shaft. Instead, structure is provided whereby the expeller is rotated at an angular velocity greater than that of the impeller. In this manner the head generated by the expeller is increased compared to prior pump arrangements and preferably is greater than the head generated by the primary impeller. This in turn reduces seal requirements and allows prior stuffing box seals to be replaced with the structure for driving the expeller.

One arrangement for making the impeller turn faster is an epicyclic gear box designed as a speed increaser. A planet carrier is keyed to rotate with the pump shaft at the shaft and impeller rotational velocity. A stationary housing spaced about the shaft functions as a stationary ring gear. A sun gear is mounted closely about the shaft and the expeller is keyed to the sun gear. Three planet gears are supported on arms of the planet carrier and run between the fixed ring gear and the sun gear, thus driving the sun gear and expeller. The gear ratios are such that the sun gear and affixed expeller rotate faster than the shaft and affixed impeller.

BRIEF DESCRIPTION OF THE DRAWINGS

The advantages, nature and additional features of the invention will become more apparent from the following description, taken in connection with the accompanying drawings, in which.

DESCRIPTION OF THE PREFERRED EMBODIMENTS

Figure 1:
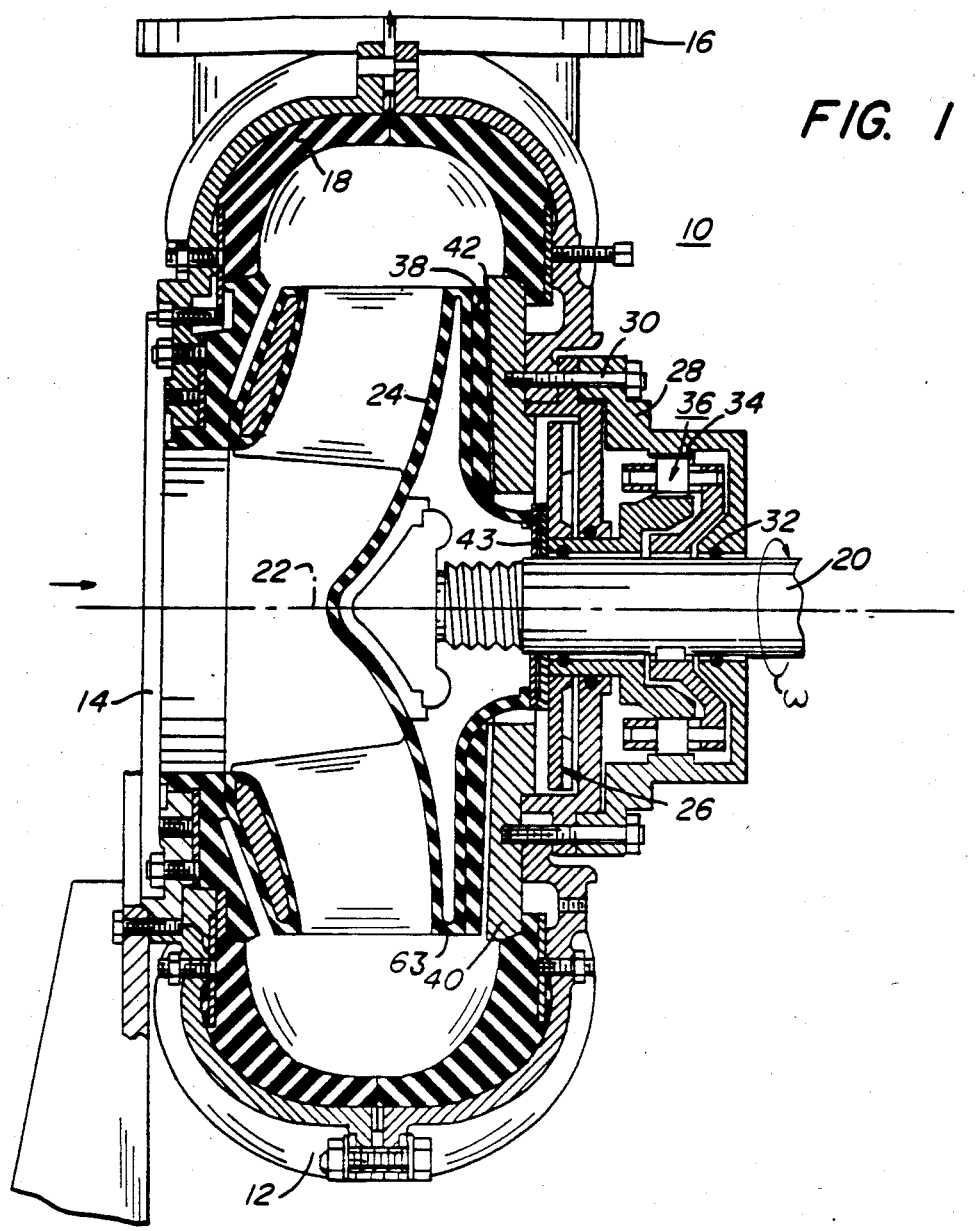
FIG. 1 is a cross sectional view of part of a pump in accordance with the invention.

Referring now to FIG. 1 there is shown the casing end of a centrifugal pump 10. Pumps of this type are useful for pumping various fluids, and particularly liquids. The pump 10 includes a casing 12 having an axial inlet 14 and a circumferential or tangential outlet 16. The pump shown is particularly useful for pumping abrasive slurries and accordingly includes a rubber liner 18 within the casing 12.

A shaft 20 is positioned along a central pump axis 22. Affixed in common fashion to the end of the shaft 20 is a primary impeller 24. The shaft 20 is rotatably driven by a mover, such as an electric motor (not shown), and the shaft 20 and affixed impeller 24 rotate at the same rotational velocity. It is to be recognized that the components thus briefly described are typical of pumps in use throughout the art, as are certain other components shown in FIG. 1, and that the inventive structure described herein is compatible with numerous other pump types and configurations.

From review of FIG. 1, it will be readily apparent to those skilled in the art that the typical stuffing box arrangement used for sealing has been eliminated. In the general area spaced behind the impeller are an expeller 26 and means for rotating the expeller 26 at a rotational velocity which is greater than the rotational velocity of the shaft 20 and affixed impeller 24.

Particularly included is a housing 28 spaced concentrically about the shaft 20. The housing 28 is affixed to the casing through fasteners 30 and is sealed against the shaft 20 through sealing means such as lip seals 32. The housing 28 is stationary and includes internal gear teeth 34. The housing thus functions as a gear box with a fixed ring gear for an epicyclic gear train indicated generally at reference numeral 36.

The primary impeller 24 can include at its rear surfaces pump out vanes 38 which assist in reducing leakage behind the impeller 24 and toward the shaft 20. The impeller pump out vanes 38 are spaced closely adjacent a liner 40 to minimize a clearance volume 42 through which leakage flow passes. A mechanical face seal 43 is positioned against the shaft and to the rear of the central portion of the primary impeller 24. This mechanical seal 43 functions to prevent leakage from contaminating the gear box 28 and gear train 36.

Figure 2:
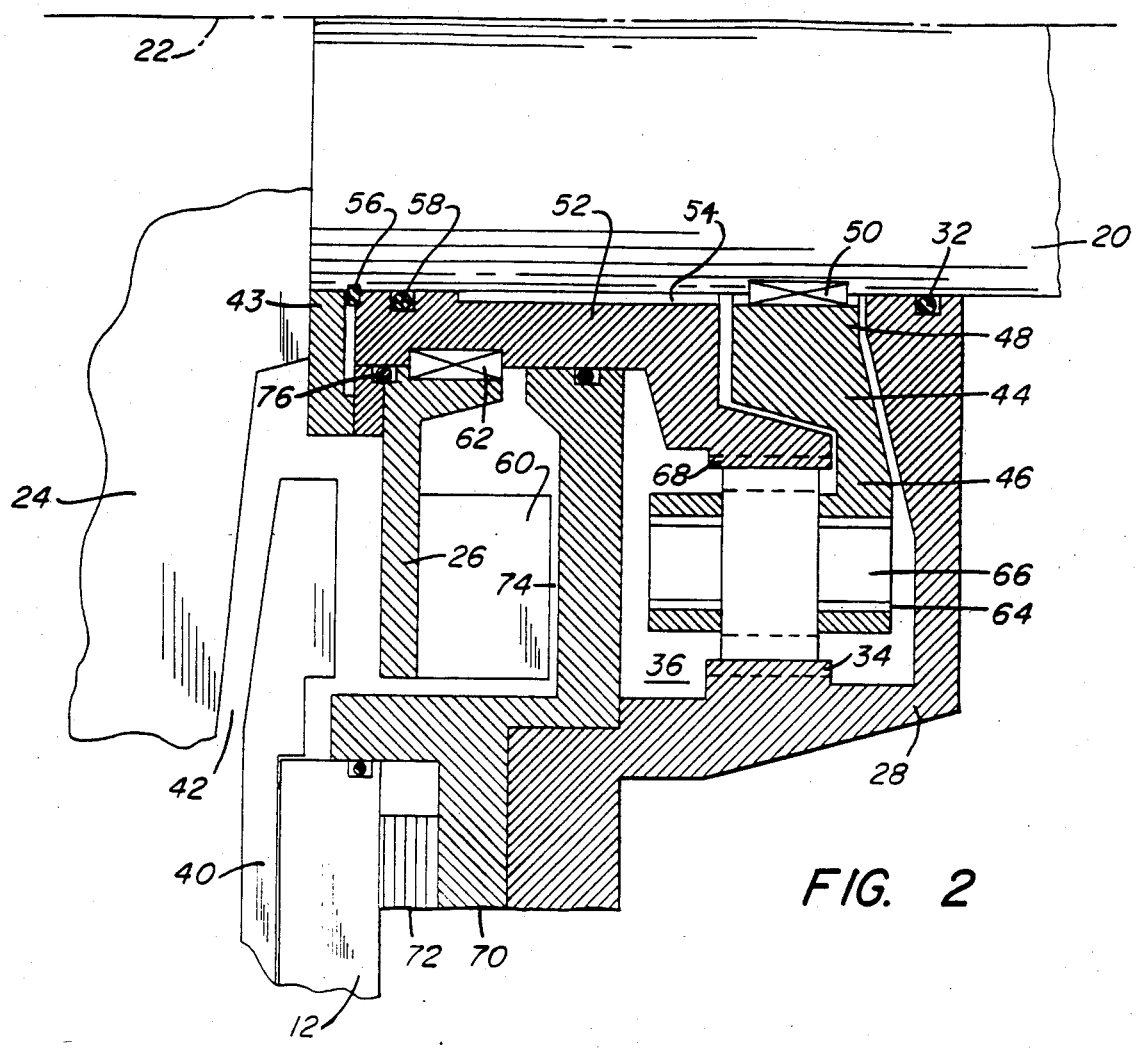
FIG. 2 is a cross sectional view of a portion of a pump showing a configuration in accordance with the invention.

An exemplary epicyclic gear train 36 is shown best in FIG. 2. It is to be recognized that any number of alternative gearing arrangements and types may be utilized which will drive the expeller at a rotational velocity greater than that of the shaft. Affixed to the shaft is a planet carrier 44 having three arms 46 extending radially from a central hub 48. The planet carrier 44 is affixed to rotate directly with the shaft by keys 50. In the region where pump arrangements typically include a shaft sleeve, adjacent the front end of the shaft 20, is positioned a sun gear 52. The sun gear 52 is positioned closely about the shaft 20 and rotates on a journal 54 supported on the shaft 20. A retaining ring 56 and O-ring seal 58 fix the position and create a seal between the sun gear 52 and the shaft 20. (Another O-ring seal 76 is positioned adjacent the expeller 26).

It will be recognized that the seals adjacent the shaft 20, the mechanical face seal 43, the lip type seal 32 and the O-ring seal 58 and 76, all protect against gear box contamination when the pump is stationary. Other sealing means can alternatively be used for stationary seal protection. The expeller 26 provides the primary means of protection during pump operation.

The expeller 26, including expelling vanes 60, is directly fixed to rotate with the sun gear 52 by keys 62. The expeller 26 redirects leakage from behind the primary impeller 24 back toward the periphery 63 (FIG. 1) of the primary impeller 24 and thus toward the pump outlet 16.

The three arms 46 of the planet carrier 44 are spaced at 120° from one another and each includes oil lubricated journals 64 which support planet gears 66. Grease or other lubricating means can also be utilized. Rotation of the shaft 20 drives the planet carrier at the same number of revolutions per minute as the shaft 20. The planet gears 66 rotate within the journals 64 between the teeth 34 of the fixed housing ring gear 28 and meshing teeth 68 of the sun gear 52. The three planet gears 66 drive the sun gear 52 at an increased rotational velocity with respect to the shaft speed. The sun gear 52 in turn drives the affixed expeller 26.

Attachment of the stationary sun gear housing 28 to the pump 10 is facilitated by an adapter housing 70 and removable shims 72. Selected shims 72 can be removed from between the pump casing 12 and the adapter housing 70 to compensate for wear of the impeller and expeller. Installation of the removed or other shims between the adapter housing 70 and stationary sun gear housing 28 can be made so as to allow the adapter housing 70 to be moved forward, toward the impeller 24, to minimize a clearance area 74 between the expelling vanes 60 and adapter housing 70. Removal or adding of shims 72 can also compensate for movement among the components and to maintain proper gear engagement, particularly where the shaft 20 is moved to compensate for wear of the primary impeller 24 and adjust the clearances to the front and rear of the impeller. Operating performance is enhanced when the sealing faces of the impeller, particularly on the suction side, run at minimum clearance. Through means well known in the art, the shaft 20 and attached impeller 24 are movable by action taken from the exterior of the pump to adjust impeller clearances. The shims 72 accommodate clearance adjustment with movement of the shaft.

The exemplary planetary configuration is compatible with a simple housing and gear box arrangement. Parameters for the exemplary gear train are provided in Table I.

TABLE I

| Diametral Pitch | 6 |
| --- | --- |
| Tooth Pitch | 0.5236 inches |
| Sun Gear, Diameter | 10 inches |
| Sun Gear Teeth, Number | 60 |
| Ring Gear Teeth, Number | 84 |
| Ring Gear, Diameter | 14 inches |
| Planet Gear, Diameter | 2 inches |
| Planet Gear Teeth, Number | 12 |

It will be apparent that many modifications and additions to the disclosed arrangement are possible without departing from the spirit and scope of the invention. Many arrangements are possible to drive an expeller at a speed greater than that of the impeller. The expeller can be made to rotate in a direction opposite to that of the impeller. A high speed expeller can be used in addition to stuffing box type sealing arrangements. Other alternatives are possible. It therefore is intended that the foregoing description be taken as illustrative, and not in a limiting sense.

We claim:

1. In a liquid pump having an inlet, an outlet, a shaft and affixed impeller rotatable to create a first head moving liquid from said inlet to said outlet and a rotatable expeller for creating a second head for redirecting liquid leakage behind said impeller toward said outlet, said expeller being of smaller outer diameter than said impeller, the improvement comprising:

means for rotating said expeller at a rotational velocity greater than the rotational velocity of said shaft and affixed impeller so as to form said second head at a pressure greater than said first head.

2. The improved pump of claim 1 wherein said expeller rotating means comprise an epicyclic gear train driven by rotation of said shaft.

3. The improved pump of claim 2 wherein said gear train comprises a planet carrier keyed to rotate with said shaft, a stationary ring gear housing said epicyclic gear train, a rotatable sun gear disposed closely about said shaft, a plurality of planet gears rotatably affixed to said planet carrier and cooperating with said stationary ring gear for rotational movement at the rotational velocity of said shaft, said planet gears driving said sun gear at a rotational velocity greater than the rotational velocity of said shaft, and said expeller being keyed to rotate with said sun gear, whereby the rotational velocity of said expeller affixed to said sun gear is greater than the rotational velocity of said impeller affixed to said shaft.

4. The improved pump of claim 1 wherein said expeller rotating means comprise a stationary gear box housing forming a ring gear spaced concentrically about said shaft and a planetary transmission positioned between said shaft and said gear box housing.

5. A liquid pump comprising:
a casing including an inlet and an outlet;
a rotatable shaft;
an impeller affixed to rotate with said shaft so as to draw a fluid into said casing through said inlet and to discharge at least a major portion of said fluid from said casing through said outlet, said impeller including a rear surface adjacent which rear surface a minor portion of said fluid leaks toward said shaft and away from said outlet;

an expeller of smaller outside diameter than said impeller for redirecting at least some of said minor portion of said fluid away from said shaft; and means for rotating said expeller at a rotational velocity greater than the rotational velocity of said impeller and shaft so as to create a pressure head greater than the pressure head created by said impeller.

6. The liquid pump of claim 5 wherein said expeller is rotated by an epicyclic gear train driven by said shaft.

7. The liquid pump of claim 6 wherein said expeller is rotatable in the same angular direction as said shaft.

8. The liquid pump of claim 6 wherein said expeller is rotatable in the opposite angular direction as said shaft.

9. The liquid pump of claim 5 further comprising a stationary gear box casing forming a ring gear spaced about said shaft and wherein said expeller is rotated by a planetary transmission positioned within said gear box casing.

10. A sealing arrangement for a pump for liquid of the type having an impeller directly rotatable with a pump shaft and a pathway adjacent the rear of said impeller through which liquid leakage flows toward said pump shaft, comprising:

a rotatable expeller positioned to redirect at least some of said leakage away from said shaft, and a gear train with a housing sealingly positioned about said shaft, said gear train interconnected with said expeller and operable to rotate said expeller at a rotational speed greater than that of said impeller.

* * * * *